United States Patent
Barrett

(10) Patent No.: US 6,795,658 B2
(45) Date of Patent: Sep. 21, 2004

(54) METHOD AND APPARATUS FOR HALTING A PRINTING DEVICE AT A PREDETERMINED INSTANT

(75) Inventor: Tony Barrett, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 205 days.

(21) Appl. No.: 10/164,196

(22) Filed: Jun. 5, 2002

(65) Prior Publication Data

US 2003/0227646 A1 Dec. 11, 2003

(51) Int. Cl.$^7$ .............................................. G03G 15/00
(52) U.S. Cl. .............................. 399/9; 399/18; 399/21
(58) Field of Search .................................... 399/9, 11, 18, 399/21, 75, 76, 85, 87

(56) References Cited

U.S. PATENT DOCUMENTS

| | | | | |
|---|---|---|---|---|
| 4,455,080 A | * | 6/1984 | Sugiura et al. ............... | 399/79 |
| 4,739,366 A | * | 4/1988 | Braswell et al. .............. | 399/10 |
| 5,999,757 A | * | 12/1999 | Shimomura et al. ........... | 399/9 |
| 6,285,843 B1 | * | 9/2001 | Obata .......................... | 399/82 |
| 6,442,358 B1 | * | 8/2002 | Regelsberger et al. ........ | 399/85 |

* cited by examiner

*Primary Examiner*—Hoan Tran

(57) ABSTRACT

A method and apparatus for halting a printer at a predetermined time to allow service personnel to open the printer and inspect the printing operation for evidence of faulty components and other problems. The printer includes a printing mechanism and a selector that is used for selecting a predetermined instant at which to halt the printer. A controller is coupled to the selector and to the printing mechanism. The controller operates to halt the printing operation at the selected predetermined instant. The instant can be measured in time, as an event that occurs in the printing process, or as a time relative to such an event. The instant can be selected from a list or selected at random by the operator. A sensing device within the printer can detect the determination of the occurrence of the printer operation event. The printing operation can be initiated in a conventional manner or the printing operation can be commenced automatically upon selection of the predetermined event.

9 Claims, 5 Drawing Sheets

| ITEM | COUNT | TIME | DESCRIPTION |
|---|---|---|---|
| 1 | -35 | -0:00.35 | PAGE PICK-UP |
| 2 | -25 | -0:00.25 | FEED ROLLER TRANSFER SENSOR ACTIVE |
| 3 | -5 | -0:00.05 | COLLATOR OUTPUT GATE SENSOR ACTIVE |
| 4 | 0 | 0:00.00 | PAGE REGISTRATION SENSOR ACTIVE |
| 5 | 1 | 0:00.01 | COLOR CAROUSEL BLACK POSITION LOCK SET |
| 6 | 2 | 0:00.02 | START BLACK SCAN |
| 7 | 30 | 0:00.30 | COMPLETE BLACK TRANSFER TO ITD |
| 8 | 32 | 0:00.32 | ADVANCE CAROUSEL |
| 9 | 42 | 0:00.42 | COLOR CAROUSEL YELLOW POSITION LOCK SET |
| 10 | 43 | 0:00.43 | START YELLOW SCAN |
| 11 | 73 | 0:00.73 | COMPLETE YELLOW TRANSFER TO ITD |
| 12 | 75 | 0:00.75 | ADVANCE CAROUSEL |
| 13 | 85 | 0:00.85 | COLOR CAROUSEL MAGENTA POSITION LOCK SET |
| 14 | 86 | 0:00.86 | START MAGENTA SCAN |
| 15 | 116 | 0:01.16 | COMPLETE MAGENTA TRANSFER TO ITD |
| 16 | 118 | 0:01.18 | ADVANCE CAROUSEL |
| 17 | 128 | 0:01.28 | COLOR CAROUSEL CYAN POSITION LOCK SET |
| 18 | 129 | 0:01.29 | START CYAN SCAN |
| 19 | 159 | 0:01.59 | COMPLETE CYAN TRANSFER TO ITD |
| 20 | 164 | 0:01.64 | TRANSFER BELT INPUT ACTIVE |
| 21 | 169 | 0:01.69 | FUSER INPUT SENSOR ACTIVE |
| 22 | 177 | 0:01.77 | COLLATOR GATE SENSOR ACTIVE |
| 23 | 184 | 0:01.84 | TRANSFER BELT INPUT DEACTIVATE |
| 24 | 186 | 0:01.86 | ADVANCE CAROUSEL TO BLACK |
| 25 | 189 | 0:01.89 | FUSER INPUT SENSOR DEACTIVATE |
| 26 | 197 | 0:01.97 | COLLATOR GATE INPUT SENSOR DEACTIVATE |
| 27 | 198 | 0:01.98 | OUTPUT FEED SENSOR ACTIVE |
| 28 | 208 | 0:02.08 | OUTPUT FEED SENSOR DEACTIVATE |

FIG. 3

METHOD AND APPARATUS FOR HALTING A PRINTING DEVICE AT A PREDETERMINED INSTANT

BACKGROUND OF THE INVENTION

1. Field of the Invention

The present invention relates to printing mechanisms. More specifically, the present invention relates to apparatus and methods for diagnosing printer performance faults.

2. Description of the Related Art

Modern printers have evolved as fast and sophisticated machines that produce high quality text and images from a digital printer file. While modern printers are currently very reliable, that the fact they are complicated machines implies that consumption, wear, component failure, misuse, and environmental factors will cause degradation in performance, partial failure, and even complete failure from time to time over the life cycle thereof. When degradation, partial failure, or complete failure occurs, it is useful to follow a logical troubleshooting procedure, using tools and aids such as those described herein, to accomplish repairs in a timely and economical manner. Since computer printers are complicated machines subject to a large number of failure modes, each repair effort must begin with a diagnostic task to identify the failure mode and isolate the faulty component or components. Accordingly, efficient diagnosis of faults is necessary to reduce the amount of time needed to effect the repair and to add certainty to the determination of the faulty components.

The diagnostic process for a printer is specific to the printing technology employed, as well as the model of the machine being serviced. There are, however, certain procedural similarities in the diagnostic process, whether the technology is a monochromatic or color printer of the inkjet, laser, offset, or any other printer variety. One similarity is the need for an analysis of the printing process at various points in time as the process proceeds in order to identify contributing faults and the source of same. By way of example, consider the modern color laser printer. As is well known in the art, systems and methods for reducing the time needed to isolate faulty components with greater certainty and effect a repair facilitate control and minimization of repair costs.

Laser printing is accomplished by encoding an image as a sequence of light pulses generated by a semiconductor laser. The pulsed beam of light is directed onto a photoconductive drum, belt, or sheet, as a sequence of scanned lines, the spacing of which represents one dimension of the printer resolution; 600 scan lines per inch, for example. The other dimension of the resolution is dependent upon the modulation rate of the light beam, for example, 600 light pulses per inch of scan. The scanning process typically utilizes a rotating mirror, which reflects the pulsed beam of light onto the photoconductive drum, belt or sheet, in a rasterized sequence. Consider the example of a drum type photoconductor for which a photoconductive drum is electrostatically charged prior to the laser beam scan. Areas of the photoconductive drum that are exposed to light are enabled to conduct electricity and the local electrostatic charge is thereby drained to a grounded substrate in the photoconductive drum. The areas of the photoconductive drum that are not illuminated by the pulsed laser beam retain their electrostatic charge. In the case of a color laser printer, three or four rasterized images are typically written to the drum, one for each of the primary colors, yellow, magenta, and cyan, and often an additional one for the color black. Some printing systems may use six or eight primary colors. Individual photoconductive drums for each color can be utilized or a single drum can be utilized multiple times in sequence. The circumference of some photoconductive drums are a fraction of a page, and being seamless, it is common practice for the same area of the drum's surface to be reused as many as eight or more times per page. In the case of larger photoconductors, depending on the relative size of the drum and print media, the same area of the photoconductor may only be used every Nth (every other, every third, every fourth, etc.) page.

Once the photoconductive drum is exposed with the image by the aforementioned laser beam scan, it is subsequently "developed" by transferring toner to the areas with the desired electrostatically charged or discharged condition. Toner is supplied from a toner cartridge in which a reserve of toner is stored. Some of the toner in this reserve is mechanically or otherwise agitated and handled by mechanical, magnetic, electrostatic, and other forces. For transfer from the toner cartridge to the photoconductive drum to occur, a cloud of toner is produced in the vicinity of the photoconductive drum along a lateral region tangential to the drum's surface. The cloud of toner has a bias voltage applied so as to cause the toner particles to be electrostatically attracted to and repelled from the various charged and discharged areas of the photoconductive drum. In the case of common monocomponent toners, the particles typically have a ferrite core, or, in the case of dual component development systems, the toner is most commonly mixed with ferrite "carrier" particles, that allow the toner particles to be manipulated by both magnetic and electric fields.

While there are a number of ways to generate a cloud of toner, one common approach is to coat the exterior surface of a hollow cylindrical developer sleeve, possessing a suitably thin wall thickness and appropriate surface characteristics, with a thin layer of monocomponent toner particles, or a toner/carrier particle mixture, where the particles are held to the surface of the sleeve by the magnetic field of one or more multi-pole magnets carefully arranged within the cylinder. As the motor driven cylinder rotates about the fixed position interior magnets, the particles on the surface move in response to the varying magnetic field or fields. Sometimes a pair of magnetic poles with the same polarity are arranged a short distance apart within the sleeve. These magnetic poles are each aligned parallel to the axis of the cylinder and run almost the full length of the cylinder. As the rotating sleeve quickly moves, the particles on its surface between the small gap between the magnetic fields causes the various particles to vigorously flip end to end due to their interaction with the magnetic fields, thus producing a cloud of toner particles over the "gap" region between the two like magnetic poles. Usually the entire developing mechanism is electrically isolated from its surroundings and a voltage bias signal is applied so that the toner particles within the cloud are electrically charged to a controlled range of values. The resulting charge on the various particles and surfaces is a function of the bias signal applied, the motion of the various particles, the magnetic field, and the properties of the various materials in the developer sleeve, the toner, carrier particles and possibly other factors. The axis of the aforementioned photoconductive drum is also arranged parallel to the developer sleeve at such a distance and angle that the gap region of the developer sleeve and the surface of the photoconductive drum with the electrostatic image are in close proximity to, though usually not contacting, one another. Both the photoconductive drum and the developer sleeve are mechanically rotated, usually at vastly different surface velocities and in opposite directions (e.g. both drums are driven counter-clockwise so that their surfaces in the gap region are moving in opposite directions). As the portion of the photoconductive drum with the electrostatic image on its surface is rotated through the charged toner particle cloud, a visible image is formed on the surface of the photoconductive drum. Where there are multiple colors, there may be multiple photoconductive drums or a single photoconductive drum may be utilized multiple times in sequence, once for each color.

The next step is to transfer the toner image to the print media (paper, transparency, label, envelope, postcard,— whatever substrate gets printed upon and eventually delivered to an output bin), which is typically paper. In many cases, the toner image is transferred directly from the photoconductive drum to the print media by use of mechanical contact and electrostatic forces. However, in the case of a color laser printer, it is sometimes preferable to use an intermediate transfer medium, which may, if used, exist in a drum, belt, sheet, or other form. For the purposes of illustration we shall assume that the intermediate transfer medium is in the shape of a cylinder or "drum" (commonly and hereinafter referred to as an "ITD"). This approach allows the three or four color images to be built-up on the intermediate transfer drum prior to a final transfer to the paper media. In the case of an intermediate transfer drum, the toner particles are transferred from the photoconductive drum to the intermediate transfer drum by a combination of electrostatic, mechanical, and other forces, and subsequently and similarly transferred to the media. The transfer of toner particles from one surface to another is never 100% efficient, so a toner scraper is positioned to scrape the excess toner from the drum surface after the transfer has occurred. While the toner scraper is commonly used, there are other methods known to those skilled in the art for removing the excess toner from the drum (or other) surface after primary (photoconductor to intermediate transfer medium) or secondary (intermediate transfer medium to the print media) transfer. The cleaned surface can then be reconditioned and used for the next page or the next color of toner.

The transfer of the toner image from the photoconductive drum, or the intermediate transfer drum, to the media is also accomplished by electrostatic, mechanical and/or other forces. For this to occur, the media is brought into close proximity to the rotating drum and moved at a velocity substantially equal to the surface speed of the transferring drum. The electrostatic, mechanical, and/or other forces applied during transfer cause the toner to move from the drum to the media. The toner is only loosely adhered to the media at this point. To bond the toner to the media, heat and pressure are typically applied in a fusing unit to make a permanent bond. It is also known in the art to use pressure alone, or even chemical techniques employing a solvent gas to adhere the toner particles to the media. The fusing unit typically employs two rotating heated drums that are pressed together by springs to apply heat and pressure to the toner and paper as they pass therebetween.

After the fusing operation, the media may be returned to the printing process again, via a duplexing unit, so that both sides can be printed upon. In the alternative, the paper media may be fed to an output tray, either directly or through a collating device that sorts pages to a predetermined order.

At several positions within the printer, paper position sensors track the movement of the paper and serve as reference points for the commencement and termination of various functions in the printer. In addition, other sensors detect consumable levels and movement of other components in the process. Also, various belts, shafts, sheaves, gears, guides and other mechanical devices are used to align and guide the paper media through the printer. Those skilled in the art appreciate that wear, degradation, consumption, faulty components, abuse, environmental factors and many other contributors inevitably lead to degraded performance of such a complicated device.

The effects of such degraded performance are many and varied. By way of example, degraded performance can manifest as blank, streaked, faded, or distorted images and text. In color machines, this can occur on a color by color basis that can result in color distortion. The paper media can be creased, torn or tattered. The entire media may have a dull appearance or may be tinted gray or some other color. The page registration may be misaligned or skewed. When problems of this nature occur, it is often necessary to service the printer by first determining the source of the fault and then repair or replace the faulty components. Repairs may include cleaning, adjusting, or other operations.

The process of identifying the faulty components involves an investigation for which an important piece of evidence is the printed media output from the printer. However, the printed output provides a course bit of after-the-fact circumstantial evidence that may conceal the true source of the fault within a complex printing process.

Beyond looking at the print defects evident in the printed media, another approach that can be used is to open the printer and inspect the various internal components such as the photoconductor, developer sleeve, intermediate transfer medium, transport belts, cleaning mechanisms, fuser, and other internal elements for signs of wear, or damage, and signs of proper or improper operation. For example, if the image on the photoconductor is good prior to primary transfer, one could conclude that the developer is working properly. If the image on the intermediate transfer medium is flawed, one could conclude that the problem happened sometime after development, and before or during primary transfer. This technique can help technicians isolate the source of the problem. Inspecting the print medium as the sheet is processed may be useful but this is not an easy task. As an alternative, one technique is to "pull the plug" during the middle of a printing cycle and then open the printer and remove various sheets of media and subassemblies for inspection.

The process of "pulling the plug" is more widely known to those skilled in the art of printer design than those skilled in printer service. Knowing exactly when to "pull the plug" on a particular printer model under a particular set of circumstances can be a mystery, even to skilled product designers.

The "pulling the plug" service approach has worked fairly well in the past. This has been particularly true in the case of printers that operate at a relatively slow output rate. For example, a printer that is capable of printing six pages per minute typically has a per-page print cycle of ten seconds. Perhaps the essential transfer operation occurs in two or three seconds. This is a reasonably long window of time in which a technician can "pull the plug". However, as printers have gained speed and, in particular, where there are multiple colors processed in each cycle, the actual print transfer operation can occur very quickly. This means it is very difficult to "pull the plug" at the instant in time most beneficial for the service operation. The problem is further exacerbated in the case where the technician desires to halt the printing process at a particular instant in time that would be most beneficial to the diagnostic procedure.

Thus there is a need in the art for an apparatus and method to interrupt a printing cycle at a predetermined, precise, predictable, and repeatable instant to aid in the diagnosis of product faults and help determine repair requirements.

SUMMARY OF THE INVENTION

The need in the art is addressed by the apparatus and methods taught by the present invention. In an illustrative embodiment, a printer is operable to halt a printing operation at a predetermined instant allowing service personnel to open the printer and inspect the printing process for evidence of faulty components and other problems, or for training and educational purposes. The printer includes a printing mechanism and a selector for selecting a predetermined halt time. A controller is coupled to the selector and to the printing mechanism. The controller operates to halt the printing operation at the selected predetermined time.

In a refinement, the predetermined halt time is measured with respect to a particular printer operation event. The event can be selected from a stored list of events. Also, the halt time can be measured as a finite increment of time with respect to the event. Instead of actual time measurements, the predetermined halt time can be measured as a count of finite increments of time about the event. The occurrence of the event can be detected by a sensing device within the printer mechanism. Instead of using time specifically, the predetermined halt time can also be defined as the occurrence of the event per se. The printing operation can be initiated in the conventional way or the printing operation can be commenced automatically upon selection of a predetermined event.

BRIEF DESCRIPTION OF THE DRAWINGS

FIG. 3 is a diagram showing a sequence of predetermined instances according to an illustrative embodiment of the present invention.

DESCRIPTION OF THE INVENTION

Figure 1:
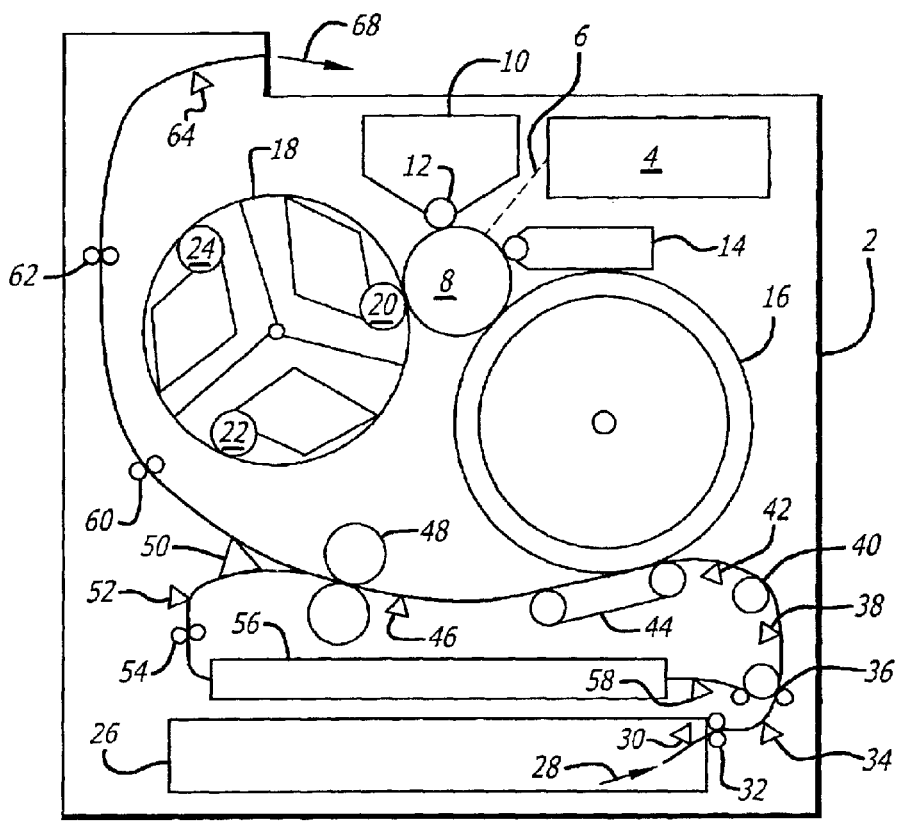
FIG. 1 is a sectional view of an illustrative embodiment of a printer implemented in accordance with the teachings of the present invention.

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Immediate print interruption through an electronic signal that essentially "pulls the plug" is often used by downstream devices, such as a collator or stapler, to stop the printer in a situation where the downstream device is unable to continue receiving printer output. This invention takes advantage of the already present "immediate print interruption" feature by placing this immediate interruption feature under additional automated control and providing a simple user interface and a common timing reference frame. This invention may even include features to prevent the printer from stopping or being stopped during certain critical periods. An example of this might be when a transparency is in the fuser. Stopping the printer might damage the fuser if the transparency were allowed to stay in the fuser too long.

The present invention is applicable to a wide variety of printers, printing machines, printing systems, copying machines, and other facsimile and duplicating apparatus. Collectively, these are referred to as a "printer" or "printers" hereinafter. The common characteristic of all these devices is that each affixes text, graphics or images to a medium. The present invention is not limited to the print technology used nor the medium employed. By way of example, and not limitation, the technology may be inkjet printing, laser printing, thermal printing, photo imaging, dye sublimation, dot matrix impact, offset printing, or any other printing technology presently known or that later becomes known to those of ordinary skill in the art. Indeed, the present teachings are not limited to printers per se. That is, the present teachings may be utilized with copiers, facsimile machines and numerous other such machines as will be appreciated by those of ordinary skill in the art.

The medium may be any physical or tangible material. This includes both rigid and flexible materials of naturally occurring substances or those that are fabricated or synthesized in any fashion. By way of example, and not limitation, these include paper, plastic, fabric, glass, metal, rubber, minerals, organic materials, or any other tangible object.

Another common characteristic of the aforementioned printers is that each produces an output that includes printed matter on the medium. Whenever the appearance or quality of the printed output fails to meet standards or requirements, an analysis as to the cause is necessary and involves a diagnostic process. Upon completion of such a diagnostic process, a determination of the source of the problem is rendered, which typically includes a specific repair action that can be taken to remedy the fault. The present invention comprises a method and apparatus to improve the diagnostic process and is applicable to the aforementioned machines.

FIG. 1 shows an illustrative embodiment of a printer implemented in accordance with the teachings of the present invention. For the purpose of illustration, the printer 2 is a color laser printer. As such, the laser printer 2 is a complex machine that operates a complex printing operation involving many parts and components that operate together to produce printed output. A brief description of a typical printing operation follows. A laser module 4 includes a semiconductor laser that produces a modulated laser beam 6, which is scanned in a rasterized pattern onto a photoconductive drum 8. As the photoconductive drum 8 rotates, a latent electrostatic image consistent with the desired printed output is created on the periphery of the drum 8. A black toner cartridge 10 supplies toner to a developer 12, which couples black toner to the scanned areas of the photoconductive drum 8 by the forces of electrostatic attraction and repulsion. The latent electrostatic image is thus converted to a patent image of toner particles on the surface of the photoconductive drum 8. An intermediate transfer drum 16 (hereinafter "ITD") rotates in the opposite direction and is synchronous with the photoconductive drum 8. Electrostatic force is applied to transfer the toner image from the photoconductive drum to the ITD 16. Thus, the toner image is transferred to the surface of ITD 16. Since this transfer process is not 100% efficient, an excess toner recovery device 14 is employed to clean any remnants of toner from the photoconductive drum 8.

Since the printer 2 is a color laser printer, three additional color imaging processes must occur to provide color printed output. Three color layers, yellow, magenta, and cyan are built-up on the surface of the ITD 16 in addition to the black layer described above. The single photoconductive drum 8 is also employed, together with the laser module 4, for this purpose. A carousel 18 houses three developers 20, 22, and 24 that each have the respective color toner cartridges yellow 20, magenta 22, and cyan 24 coupled thereto. During the scanning and transfer of the black toner, the carousel 18 is positioned so that none of the three developers 20, 22, or 24 are in contact or proximity with the photoconductive drum 8. As each subsequent color image is produced, the carousel 18 is first indexed to a position such that the appropriate color developer is aligned with the photoconductive drum 8.

FIG. 1 illustrates that the yellow developer 20 is in position with the photoconductive drum 8. The laser 6 scans the yellow color plane image onto the photoconductive drum. As this occurs, the drum 8 rotates and passes by the yellow developer 20 so that the invisible latent electrostatic image can attract and repel toner, thus becoming visible and form a physical toner pattern on the surface of the photoconductive drum 8. During the time the yellow 20, magenta 22, and cyan 24 color planes are being developed, the developer sleeve 12 in the black toner cartridge 10 is not rotating and a reverse bias voltage is applied to prevent development of the black toner onto the other color planes. Drum 8 continues rotating and presents the yellow color plane to the ITD 16. Electrostatic forces induce the toner pattern to transfer from the drum 8 onto the ITD 16 as a second layer over the previously deposited black toner layer. After the yellow image has been transferred, the carousel 18 is indexed to the next color, and the process repeats. Thus, the printer 2 employs four transfer processes to apply four colors of toner as four separate, but related, images onto the surface to ITD 16. The four image layers are visible as toner patterns on the surface of the ITD 16. It should be noted that the operation and coordination of the aforementioned components is managed by a controller (not shown), of which type is generally understood by those skilled in the art.

The print media 28, which is commonly paper, is picked up from a feed tray 26 and a page pick-up sensor 30 goes active indicating to a controller (shown as item 90 in FIG. 2) that the paper feed has succeeded. A pair of feed rollers 32 guide the paper 28 to paper input gate 36. The paper input gate 36 receives paper 28 from either the paper tray 26 or a duplexer 56 (discussed hereinafter). The page 28 is transported forward past a paper gate output sensor 38 that indicates the presence of the page 28 at that position. Note that each of the paper position sensors provides two bits of information to the controller. First is the instant when the page 28 reaches the position of the sensor and second is the instant when the page 28 has passed and is no longer at the position of the sensor. Thus, two separate printer events occur for each sensor as the page 28 passes through the printer.

The time duration between these two signals is indicative of the speed with which the page 28 is moving. A guide roller 40 directs the page to a page registration sensor 42, which also provides an indication that the page 28 is positioned for transfer. The page registration sensor is important because it controls the position of the image on the page 28. As will be discussed below, the page registration is a printer event that is particularly useful according to the present invention. As the page 28 passes between transfer belt 44 and ITD 16, the two devices move in synchronous and electrostatic, mechanical, and/or other forces transfer the toner image from the ITD 16 to the page 28.

The page movement continues as it engages a fuser input sensor 46 to the fuser 48 where heat and pressure are applied to fix the toner image to the page. The page moves on and engages the duplexer gate 50, which either diverts the page to the duplexer 56 or to the printer output tray 68. Assuming the page is to be duplexed, a duplexer sensor 52 detects the presence of the page and a pair of duplexer rollers 54 guide the paper 28 into the duplexer 56, which provides the function of reversing and holding the page so that the reverse side can be printed upon. When the page exits the duplexer 56 its presence is detected by duplexer output sensor 58 before it reaches the paper input gate 36, discussed above. If the page 28 is diverted toward the output of the printer at duplexer gate 50, it engages a first pair of guide rollers 60 and a second pair of guide rollers 62. These rollers guide the paper past output sensor 64, as the page is ejected to the output tray 68.

One of the most powerful techniques for diagnosing problems in printers is to stop the printer at certain points in mid-print cycle, then remove various parts and pages for inspection. As printers become faster and more complicated it is more difficult to stop the printer at the most opportune moments. The present invention allows the user or a service provider to program a stop point with split second accuracy at some duration after a fixed and common starting point. For example, useful diagnostic stop points, based on timing diagram analysis, or derived empirically, can be published in service documentation, on the Internet, or various other places. A diagnostic routine is initiated and the routine requests a stop point time value. The printing process starts and sets the counter to zero when a top-of-page signal for the first color plane is received. In the illustrative embodiment, the printer or formatter starts counting ten millisecond periods and, when the programmed value is reached, the printer immediately stops. Ten milliseconds resolution equates to approximately 1 mm of media movement in a modern high performance printer.

When the printer 2 operates, all of the access openings and other covers are typically closed. The only objective indication of the printer performance is the appearance and quality of the output printed media. When the appearance and quality of the printed output from the print mechanism falls below specification, then a diagnostic process must be followed to determine the cause. If the printed matter is not properly aligned on the page, for example, it may be an indication that the page did not register properly as it entered the printing process. However, it might have registered properly only to become skewed somewhere within the printing mechanism. The printed media in the output tray of the printer does not clearly indicate where the fault lies. In another example, perhaps the printed media appears to have been smeared slightly along one axis of the page. This could result from an improper transfer of toner, but the printed output does not clearly indicate whether that occurred in the photoconductor or ITD transfer or the ITD to page transfer. In yet another example, the leading edge of the media may be torn. This could occur anywhere in the printing process from the initial paper feed to the final output to the output tray. Many other circumstances may arise where the printed media indicates some problem, but does not clearly indicate the internal source of the problem.

As discussed above, in accordance with conventional practices, service personnel often utilize a "pull the plug"

approach to isolating the problem. That is, the print process is manually interrupted so that the printer mechanism can be opened and inspected while the print media is in the middle of a printing operation. This allows that service personnel to visually inspect the mechanism and print media at the point in the process where, for example, the page has just started to become skewed out of alignment.

The present invention allows the printer mechanism to be halted at an instant selected with great precision. Further, in accordance with the present teachings the halting operation can be repeated and adjusted as needed. This allows the service personnel to converge on a key area in the printing process where the problem first manifests itself. For example, consider the case where the printed media exits the printer with a tear along its leading edge. The present invention may be used to halt operation of the printer first when the page exists the paper tray 26. Next, the inventive system may be used to halt operation where the page enters the paper input gate 36. Next, the inventive system may be used to halt operation where the page contacts the transfer belt 44, and so on until the point where the tear first appears becomes evident.

Figure 2:
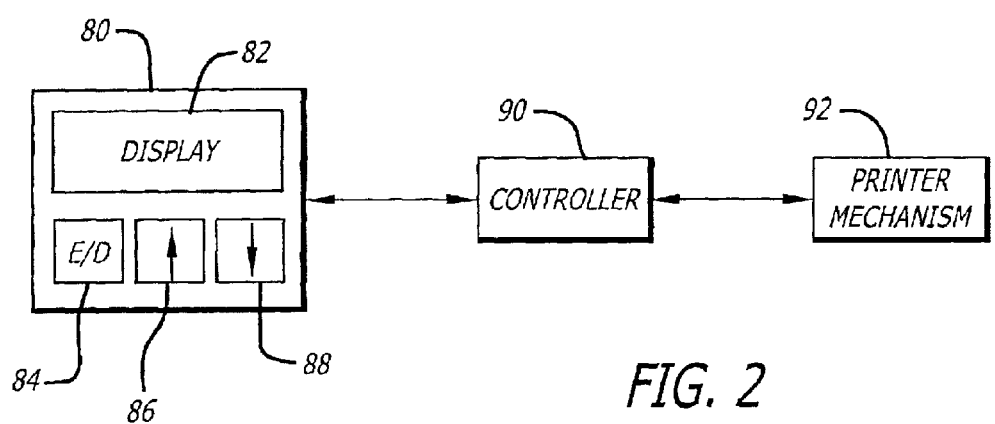
FIG. 2 is a functional block diagram of an illustrative embodiment of the inventive printer illustrating the user interface.

FIG. 2 illustrates a functional block diagram of the printer illustrated in FIG. 1. FIG. 2 shows the printer mechanism 92 coupled to the controller 90, which generally operates the printer mechanism 92. Those of ordinary skill in the art will appreciate that the controller may be easily implemented in software running on a microprocessor.

FIG. 2 illustrates the portion of the printer user interface 80 that is utilized to implement the present invention. An enable/disable function key 84 is used to enable and disable the automatic mechanism halting function of the present invention. If the halting function is presently disabled, actuation of key 84 will enable the halt function. If the halt function is presently enabled, and the printer has not yet halted, then actuation of key 84 will disable the halt function and the printer will continue through its present operation without halting. A display 82 is used to indicate the status and offer selection choices to a user.

The display 82 facilitates the selection of the instant at which the printer mechanism is to be halted. This choice can be made in two basic approaches. The first is based on time or increments of time, and the second is based on events that occur during the printing function of the printer mechanism. In either case, the user is offered a selection via the display 82 and then either selects the offered choice by pressing key 84, or some other key on the user interface, or actuates the up key 86 and down key 88 to scroll through a list of choices until the desired choice has been identified. Each choice is displayed in turn on the display 82. Alternatively, through proper interaction with the displayed status and use of the available keys, values not present in the list of choices could be entered. For example, one of the menu choices displayed could be "None of the above" and upon actuating the appropriate key sequence to activate this selection, the arrow keys could be used to enter any desired time value. Holding a key for more than a fraction of a second could cause the time values to scroll through the display very quickly and/or in larger increments where individual shorter duration key presses would cause the time values to increment or decrement by individual steps. Each of the keys is coupled to the controller 90. As suggested above, the present invention may be embodied as software or firmware within controller 90.

Those of ordinary skill in the art will realize that the selection of user interfaces to enable the present invention is a matter of design choice. The display and keypad function can be highly sophisticated so that just a few actuators are needed, or the approach could be more simplistic, such as using a QWERTY keyboard and requiring the user to enter complex command strings. In any case the user will enable the function and then specify the halt instant as either a printer event or a moment in time, which can be either absolute or with respect to a reference event.

Reference is directed to FIG. 3, which is a memory map 94 of a sequence of predetermined instances that can be selected by the user when the printer halting function is enabled in accordance with the teachings of the present invention. The choices illustrated are based on ten millisecond time increments offset from a printer mechanism event. The memory map 94 entries are identified by an ITEM number, which ranges from No. 1 to No. 28. The TIME is illustrated in minutes:seconds.hundreths format as "0:00.00". Thus, the smallest increment is one one-hundredth of a second, or ten milliseconds. Each such increment is entered as a COUNT in another column in the map 94. Thus, the user can select actual TIME values, or a COUNT value from the map 94. Each entry line also includes a DESCRIPTION of the printer mechanism function at the particular instant. These are self explanatory in FIG. 3. "ITD" in map 94 of FIG. 3 refers to the Intermediate Transfer Drum. While executing a troubleshooting operation, the user can select an ITEM from the table by scrolling though the choices in the user interface display or the user can add or subtract time increments to fine tune the exact instant that the halt operation is executed. By running multiple halt operation tests, the user is able to converge on an optimal instant for determining the actual cause of a fault in the print operation.

In an alternative embodiment of the present invention, the memory map comprises a list of printer mechanism events that are offered to the user in the user interface. An example of such a memory map appears in Table 1 below:

TABLE 1

| Item | Description |
| --- | --- |
| 1 | Page Pick-Up Sensor Active |
| 2 | Paper Gate Output Sensor Active |
| 3 | First Black Scan Line Written |
| 4 | Black Image Transferred to ITD |
| 5 | Carousel Yellow Register Locked |
| 6 | Page Input to Transfer Belt |
| 7 | Toner Transfer Complete |
| 8 | Page Input to Fuser |
| 9 | Duplexer Input Sensor Active |
| 10 | Page Output Sensor Active |
| Etc. | Etc. |

Note that Table 1 is an exemplary list. Those of ordinary skill in the art will appreciate that the actual list of events entered into such a table will correspond to the printer mechanism that the teachings of the present invention are applied to, and will typically be considerably longer. This list can also be updated from time to time.

Figure 4A:
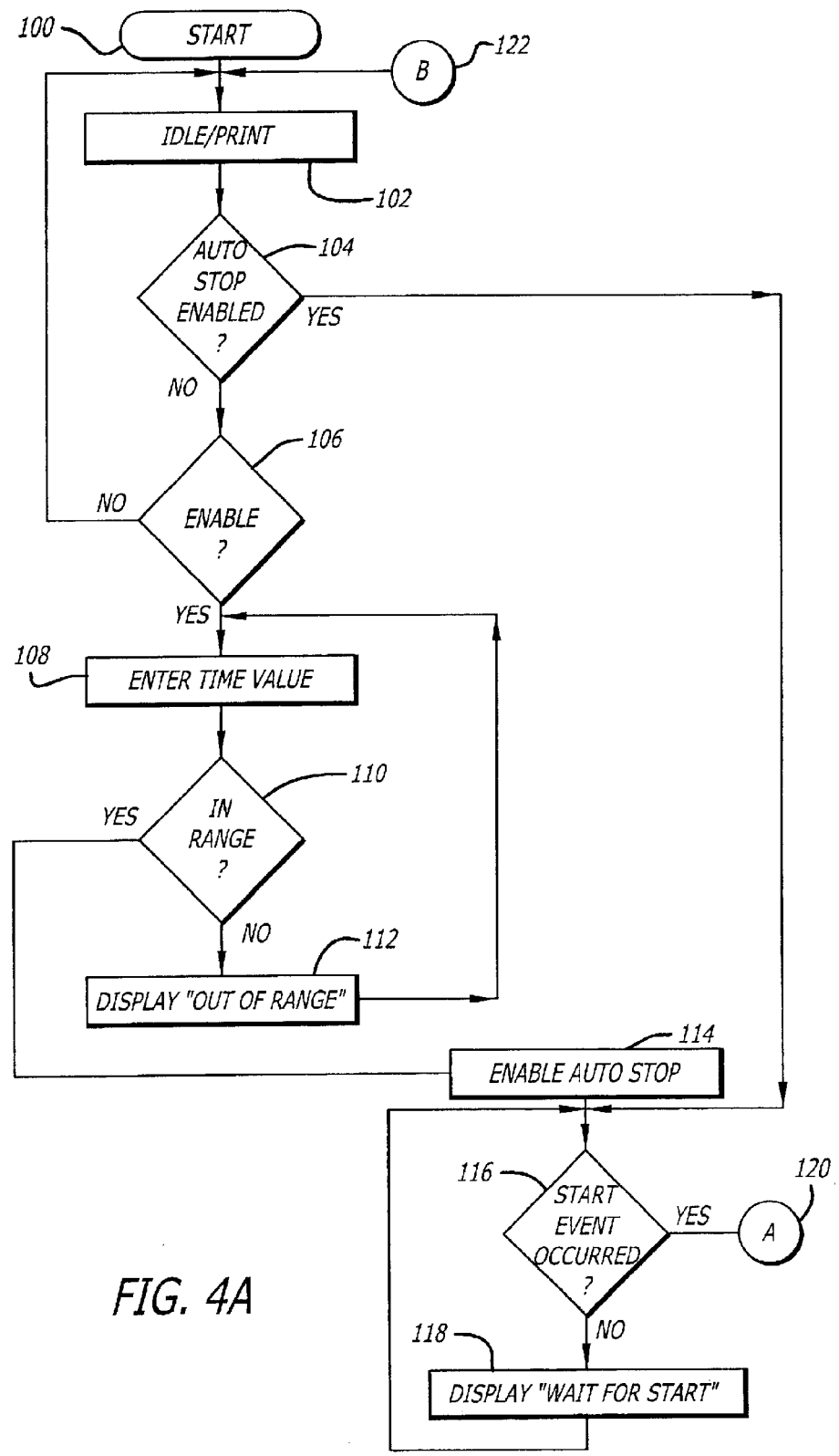
FIGS. 4A and 4B show a flow diagram of an illustrative embodiment of the present invention.
Figure 4B:
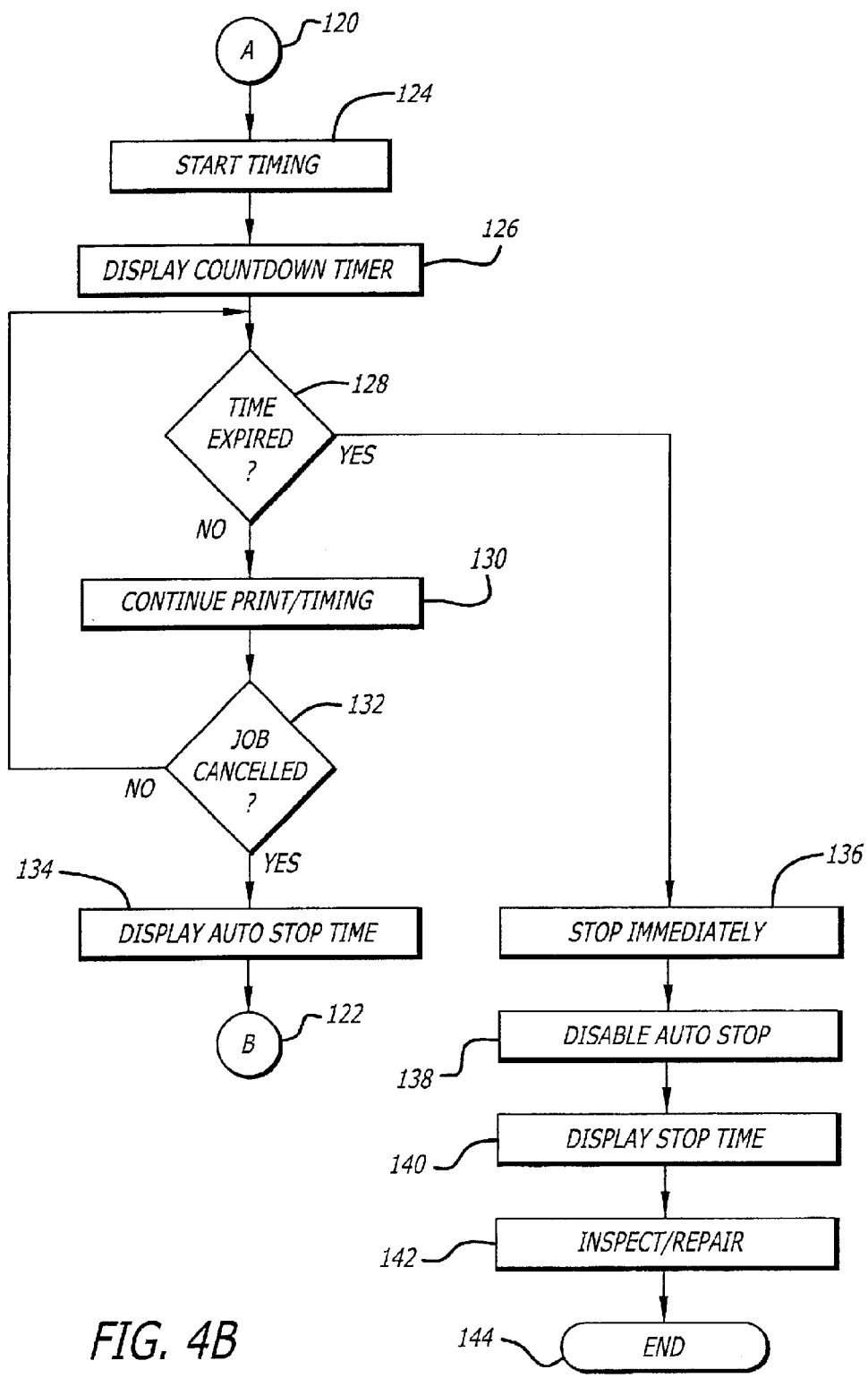

Reference is directed to FIGS. 4A and 4B, which illustrate a flow diagram of an illustrtive embodiment of the present invention. The process is entered at step 100 where is starts when called from some other routine in the printer. Flow immediately proceeds to step 102 where the printer is either idle or in a printing operation. A test is conducted at step 104 to determine whether the halting function, hereinafter called "auto-stop", is enabled or not. If it is enabled, then flow proceeds to step 116, which is discussed below. On the other hand, if the auto-stop function is not enabled at step 104, then flow continues to step 106 where the user may enable the function. If the user does not enable the function, flow recirculates back to step 102 and repeats until the user enables auto-stop at step 106. When the test at step 106 results in a user enablement of the auto-stop function, flow continues to step 108 where the user enters a time, number of increments of time, or an other item indicative of an amount of time. At step 110 a test is made to determine if the time entered by the user is valid and within the allowable range of time.

In the illustrative embodiment, the range of time is two minutes about the reference event. If the value is not within the allowable range, flow continues to step 112 where the "OUT OF RANGE" indication is displayed for a moment and then flow recirculates to step 108 to allow the user to enter another time value. On the other hand, at step 110, if the time value is within the allowable range, flow continues to step 114, where the controller enables the auto-stop function.

At step 116, the controller tests to determine whether the reference start event has occurred. In the illustrative embodiment, one such start event is the activation of the page pick-up sensor, although any other event could be specified without departing from the scope of the present teachings. If the start event has not yet occurred at step 116, then the controller displays "WAIT FOR START" on the display at step 118. The occurrence of the start event may occur automatically, by user initiation or by remote activation.

The process then recirculates to step 116 to execute the test anew. If the start event has occurred at step 116, then flow continues to step 124 in FIG. 4B, via connector nodes "A" 120. At step 124 the controller begins timing the duration from the start event to the selected time. Note that the time may be measured in positive or negative time, thus the selected instant may occur prior to the reference event. In that case, the controller uses a free running timer and references the negative time to the reference event.

After the timer is running at step 124, the controller displays a countdown timer on the display for the reference and convenience of the user. At step 128 a test is conducted to determine if the timer has expired and whether the instant for halting operation has arrived. If not, flow continues to step 130 where the printing and timing functions continue. A test is then conducted at step 132 to determine if the user has canceled the auto-stop function. If the user has canceled the function, flow returns to step 102, via connecting node 122, to the idle/printing mode.

On the other hand, if at step 132 the current auto-stop job has not been canceled, flow returns to step 128 to renew the test for expiration of the selected time duration. If that time has expired at step 128, then the process immediately stops the printing mechanism at step 136. The auto-stop function is disabled at step 138 and the stop time is displayed at step 140. At step 142, the user or service personnel inspect the printer mechanism and make needed repairs. The process ends at step 144.

Figure 5:
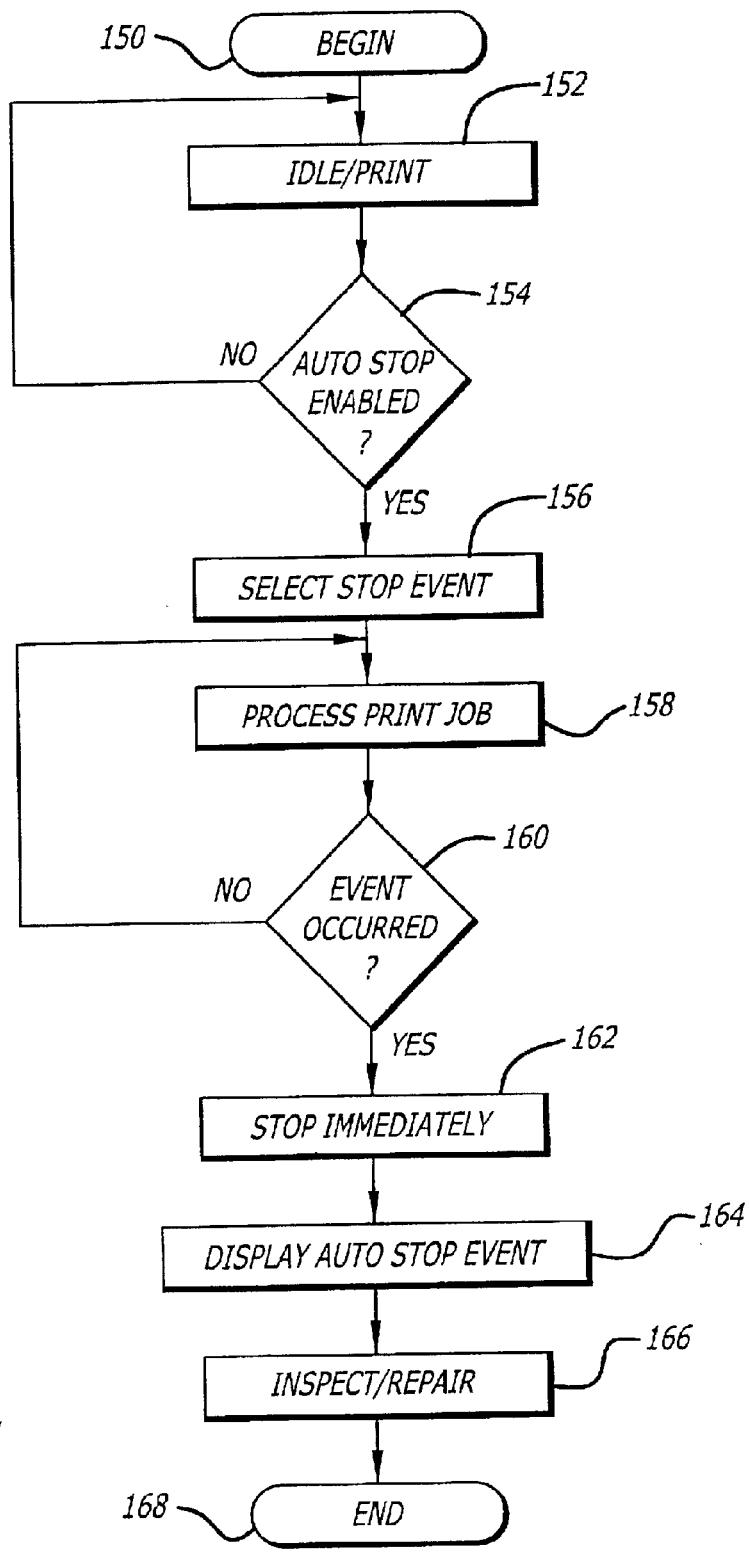
FIG. 5 is a flow diagram of an alternative embodiment of the present invention.

Reference is directed to FIG. 5, which is a flow diagram of an alternative embodiment of the present invention. In this embodiment, the user selects the instant for halting the printer mechanism according to a particular event that occurs during the printing cycle. The process begins at step 150 and proceeds to step 152 where the printer is either in the idle state or in the process of printing. At step 154, a test is conducted to determine whether the auto-stop function is enabled or disabled. If it is not enabled, flow returns to step 152. On the other hand, if auto-stop is enabled at step 154, then flow continues to step 156 where the user selects the stop event from a list of stop events recalled by the controller from memory and displayed on the display.

At step 158, a printing job is processed and at step 160 a test is conducted to determine whether the selected event has occurred or not. If not, the process returns to step 158 and recirculates until the test at step 160 is met. Thus, when the selected event occurs at step 160, the controller stops the printer mechanism immediately at step 162. At step 164, the controller displays the stop event on the display, and the user or service personnel conducts the inspection and/or repair at step 166. The process ends at step 168.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

What is claimed is:

1. A media processing system comprising:

a media processing mechanism having a media processing cycle;

means for storing a predetermined media processing cycle halt time in response to a sensed event or condition;

means for sensing said event or condition; and means for halting said media processing cycle at said halt time at said predetermined halt time in response to said event or condition.

2. The invention of claim 1 wherein said sensing means includes a plurality of sensors disposed in said media processing mechanism.

3. A method of halting a media processing operation in mid cycle comprising the steps of:

selecting an event;

initiating said media processing operation;

sensing said event; and halting said media processing operation when said event is sensed.

4. The method of claim 3 wherein said media processing event is selected from a list of media processing events.

5. The method of claim 3 wherein said predetermined halt time is measured as a finite increment of time about said media processing event.

6. The method of claim 3 wherein said predetermine halt time is measured as a count of finite increments of time about said media processing event.

7. The method of claim 3 wherein said predetermined halt time is defined as the occurrence of a media processing event.

8. The method of claim 7 wherein said media processing event is selected from a list of media processing events.

9. The method of claim 3 wherein the media processing operation commences automatically upon selection of said predetermined event.

* * * * *